J. P. BEAUPRE.
AMALGAMATING SLUICE BOX.
APPLICATION FILED SEPT. 22, 1920.
1,381,159.
Patented June 14, 1921.
2 SHEETS—SHEET 1.
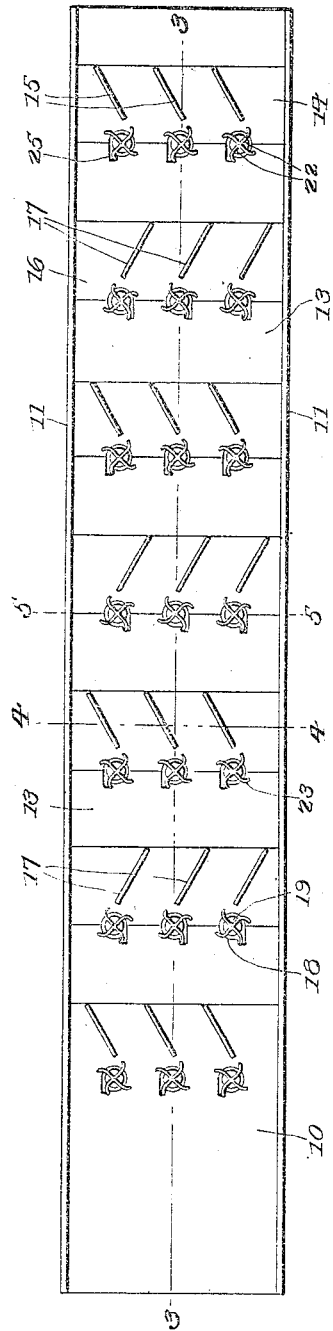
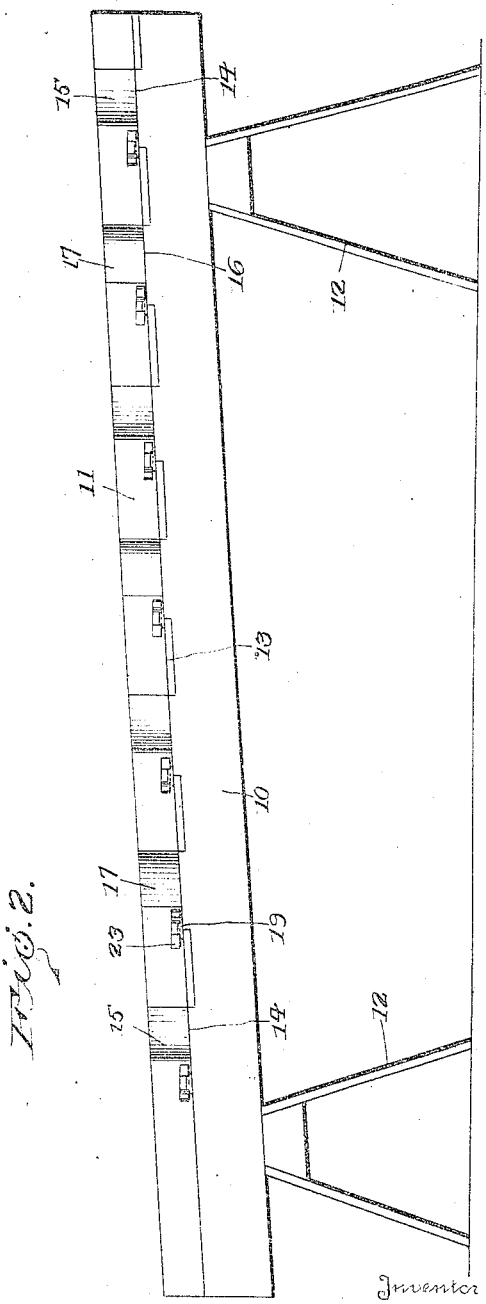
Inventor
J. P. Beaupre.

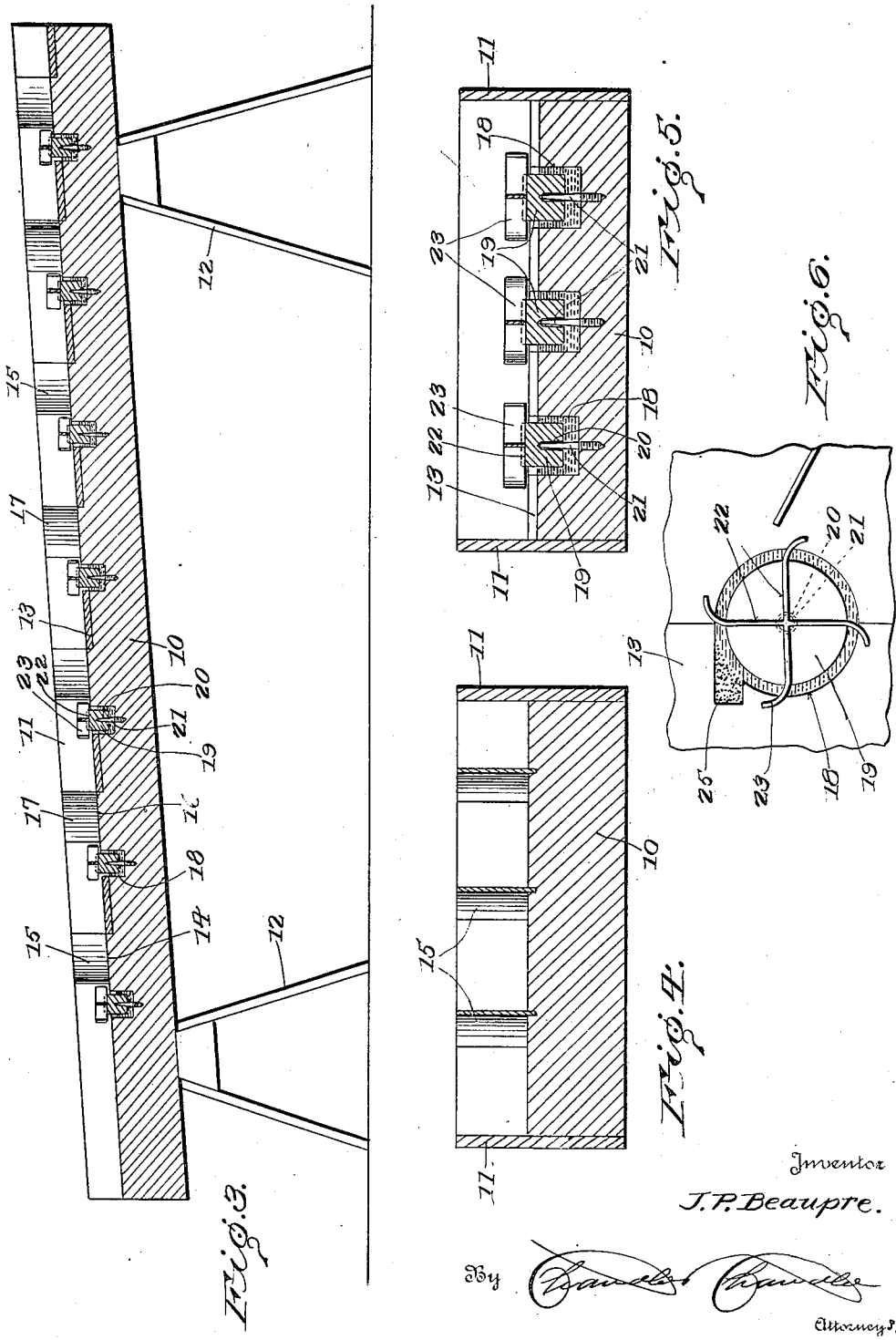

UNITED STATES PATENT OFFICE.

JOHN P. BEAUPRE, OF BUTTE, MONTANA, ASSIGNOR OF ONE-HALF TO GEORGE E. SMILEY, OF LA JUNTA, COLORADO.

AMALGAMATING SLUICE-BOX.

1,381,159.     Specification of Letters Patent.     Patented June 14, 1921.

Application filed September 22, 1920. Serial No. 412,046.

*To all whom it may concern:*

Be it known that I, JOHN P. BEAUPRE, a citizen of the United States, residing at Butte, in the county of Silver Bow, State of Montana, have invented certain new and useful Improvements in Amalgamating Sluice-Boxes; and I do hereby declare the following to be a full, clear, and exact description of the invention, such as will enable others skilled in the art to which it appertains to make and use the same.

This invention relates to improvements in amalgamating devices.

One object of the invention is to provide an amalgamating sluice box to receive the discharge directly from the stamps, and which will thoroughly amalgamate the gold or other precious material which is contained in the slime.

Another object is to provide a construction which includes an arrangement of alternate series of stationary guides or deflectors, rotary deflectors, and amalgamating plates.

A further object is to provide a device of this character in which the parts which rotate are actuated by the undercurrent of the slime which passes through the sluice.

Other objects and advantages will be apparent from the following description when taken in connection with the accompanying drawings.

In the drawings:

Figure 1 is a top plan view of a sluice box made in accordance with my invention.

Fig. 2 is a side elevation of the same, one of the side boards being removed.

Fig. 3 is a vertical longitudinal sectional view taken on the line 3—3 of Fig. 1.

Fig. 4 is a vertical transverse sectional view taken on the line 4—4 of Fig. 1, enlarged.

Fig. 5 is an enlarged vertical transverse sectional view taken on the line 5—5 of Fig. 1.

Fig. 6 is an enlarged plan view of a portion of the sluice showing one of the rotary deflectors in detail.

Referring particularly to the accompanying drawings there is shown an elongated sluice box comprising the bed 10 and the vertical side members 11, said bed being supported on the trestles 12, or other suitable supports.

Secured on the upper side of the base or the bed 10 at suitably spaced intervals are the transversely arranged amalgamating plates 13, formed of copper and coated with nitro-silver. In the alternate spaces 14 are arranged the diagonal and vertical deflector ribs or blades 15. Arranged in the other alternate spaces 16 are the diagonally disposed deflector ribs or blades 17, the last-mentioned series extending in a longitudinal direction opposite to that of the first set or series of ribs. Thus, as clearly seen in Fig. 1, the ribs taken collectively, extend in a zig-zag manner longitudinally of the sluice box. Arranged between the forward end of each of the series of ribs and the next adjacent amalgamating plate, are the circular pits 18, each one of which is arranged at the forward end of one of the ribs in such manner that the ribs extend tangentially to one side of the pits. These pits are formed in series running transversely of the sluice box, and are cut in the bed 10 to a depth of about two inches and a diameter of about two and one-half inches. Each of these pits is filled, or partially filled with mercury to catch and combine or amalgamate with the precious metals in the slime, as the slime passes down the sluice. Arranged in each one of these pits, and floating on the surface of the mercury, is a rotary deflector which consists of a body portion 19 having formed in the lower portion thereof a recess 20, for the reception of the upper pointed end of a pin or post 21 which is secured in the center of the bottom of the pit. The bottom of the recess is formed in tapered outline to permit a slight rocking movement of the deflector on the post. Formed in the upper face of the rotary deflector member are the intersecting kerfs or grooves 22, and secured in these grooves are the strips of metal or other suitable material 23, the ends of said strips being extended beyond the sides of the member 19, and curved to provide blades to be engaged by the slime as it passes through the sluice. This action will cause the deflectors 19 to rotate and keep the mercury agitated. It will be noted that the blades 24 of one series of members 19 extend in one direction, while the next series has its blades extending in the opposite direction. Thus every alternate series of deflectors has its blades extending in one direction and the other alternate series has its blades extending in the other direction. This produces a tortuous passage for the slime to pass through as it flows down the sluice.

Extending forwardly from the series of pits which have the deflectors turning to the right, and at the left hand side of said pits, are the smaller pits 25, in which are deposited small quantities of sand. When the members 19 are placed in the pits a quantity of the mercury will over flow therefrom and pass into the sand pits.

The sluice box is positioned with its upper end elevated and disposed beneath the discharge spout of a stamp, the slime from the stamp being deflected by the ribs 15 toward one side of the box where it engages the blades 24 of the first series of rotary deflectors which revolve in the mercury, so that the mercury is agitated and any precious metal in the slime will be caught in the pits and thoroughly amalgamated with the mercury. It will be noted that the blades, by reason of their opposite rotation, cause the slime to be deflected first toward one side of the box and then toward the other. The slime passes from the first series of rotary deflectors over the amalgamating plate 13 from whence it is deflected toward the opposite side of the box by the next set of ribs 17. These ribs direct the slime against the second set of rotary deflectors which turn in the opposite direction to the first set. From here the slime continues its tortuous course to the end of the box, being first deflected by one set of diagonal ribs, rotating one series of rotary deflectors, thence over an amalgamating plate in continuous succession, being finally discharged from the end of the sluice.

When the slime has passed through the box, the box is dumped over so that the mercury in the pits, as well as the same in the sand pits, may be collected and treated in the usual manner to remove the gold therefrom, while the amalgamating plates 13 are treated in the usual manner to remove the amalgamated coating therefrom.

It will thus be seen that an efficient device of this character has been provided, in which practically the greater part of the common 60% loss is saved by the mercury pits and rotary deflectors.

What is claimed is:

1. An amalgamating device including a sluice box, transversely arranged amalgamating plates disposed in the box, at suitable intervals, a plurality of series of diagonally arranged deflector ribs, said series being disposed between the amalgamating plates, the sluice box having a plurality of transversely extending series of mercury pits between the plates and ribs, the ribs of one series extending in a direction opposite to the ribs of the adjacent series, and tangentially to one side of the pits, and rotating deflectors floatable on the mercury in said pits.

2. In an amalgamating device, a sluice-box, amalgamating plates in the box and arranged at equally spaced intervals, oppositely extending guides between the plates, the box being formed with circular pits between the plates and guides, said pits containing mercury, and series of rotating deflectors floated in the mercury, each of the deflectors having a tangentially extending series of blades, the blades of one series extending in a direction opposite to those of the adjacent series, the forward ends of the rotary deflectors being disposed in line with the blades, whereby the rotary deflectors of one series will turn in a direction opposite to that of the adjacent series.

3. In an amalgamating device, a sluice box, amalgamating plates, stationary deflectors between the plates, and independently rotatable mercury supported deflectors between the plates and stationary deflectors.

4. In an amalgamating device, a sluice having pits formed therein and containing mercury, each of said pits having a forwardly extending smaller pit communicating therewith, said smaller pit containing sand, vertical pivot posts mounted in the first-named pits, curved blades carried by the pivot posts and moving above the surface of the sluice.

In testimony whereof, I affix my signature in the presence of two witnesses.

JOHN P. BEAUPRE.

Witnesses:
J. E. POWELL,
M. C. TINDALL.